(12) United States Patent
Grigoriew

(10) Patent No.: US 9,416,256 B2
(45) Date of Patent: Aug. 16, 2016

(54) FIRE RETARDANT AND/OR ANTISTATIC, NON-MERCURY CATALYZED POLYURETHANE ELASTOMER

(71) Applicant: Dow Global Technologies LLC, Midland, MI (US)

(72) Inventor: Marcin Grigoriew, Macclesfield (GB)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/415,246

(22) PCT Filed: Jul. 18, 2013

(86) PCT No.: PCT/US2013/051047
§ 371 (c)(1),
(2) Date: Jan. 16, 2015

(87) PCT Pub. No.: WO2014/015119
PCT Pub. Date: Jan. 23, 2014

(65) Prior Publication Data
US 2015/0203665 A1    Jul. 23, 2015

Related U.S. Application Data

(60) Provisional application No. 61/672,943, filed on Jul. 18, 2012.

(51) Int. Cl.
| *C08G 18/10* | (2006.01) |
| *C08K 13/02* | (2006.01) |
| *C08G 18/42* | (2006.01) |
| *C08G 18/66* | (2006.01) |
| *C08K 3/00* | (2006.01) |
| *C08K 3/32* | (2006.01) |
| *C08K 5/00* | (2006.01) |
| *C08K 5/521* | (2006.01) |
| *C08L 75/04* | (2006.01) |
| *C08L 75/06* | (2006.01) |
| *C08G 18/24* | (2006.01) |
| *C08G 18/76* | (2006.01) |

(52) U.S. Cl.
CPC .............. *C08K 13/02* (2013.01); *C08G 18/242* (2013.01); *C08G 18/42* (2013.01); *C08G 18/4202* (2013.01); *C08G 18/4236* (2013.01); *C08G 18/4238* (2013.01); *C08G 18/4241* (2013.01); *C08G 18/66* (2013.01); *C08G 18/664* (2013.01); *C08G 18/6607* (2013.01); *C08G 18/7671* (2013.01); *C08K 3/0058* (2013.01); *C08K 3/0066* (2013.01); *C08K 3/32* (2013.01); *C08K 5/0066* (2013.01); *C08K 5/0075* (2013.01); *C08K 5/521* (2013.01); *C08L 75/04* (2013.01); *C08L 75/06* (2013.01)

(58) Field of Classification Search
CPC ........... C08G 18/4202; C08G 18/4236; C08G 18/4241; C08G 18/6607; C08G 18/664; C08G 18/7671; C08K 5/0066; C08K 13/02
See application file for complete search history.

(56) References Cited

U.S. PATENT DOCUMENTS

| 4,243,755 | A | | 1/1981 | Marx et al. |
| 4,293,657 | A | | 10/1981 | Nissen et al. |
| 4,305,861 | A | | 12/1981 | Marx et al. |
| 4,435,537 | A | | 3/1984 | Horn et al. |
| 4,448,951 | A | | 5/1984 | Rupert et al. |
| 4,448,952 | A | | 5/1984 | Patton, Jr. et al. |
| 4,514,426 | A | | 4/1985 | Jordan et al. |
| 4,560,708 | A | | 12/1985 | Horn et al. |
| 4,857,364 | A | * | 8/1989 | von Bonin ......... C08G 18/0885 427/254 |
| 4,980,445 | A | | 12/1990 | van Der wal et al. |
| 5,585,409 | A | * | 12/1996 | Volkert ................. A43B 13/04 521/159 |
| 6,346,205 | B2 | * | 2/2002 | Sieker ....................... 252/182.24 |
| 6,613,389 | B2 | | 9/2003 | Li et al. |
| 7,022,746 | B2 | | 4/2006 | Lockwood et al. |
| 8,415,414 | B2 | | 4/2013 | Maeder et al. |
| 2003/0118739 | A1 | | 6/2003 | Li et al. |
| 2007/0249778 | A1 | | 10/2007 | Clemens et al. |
| 2009/0300946 | A1 | | 12/2009 | Egbers et al. |
| 2011/0230604 | A1 | | 9/2011 | Maeder et al. |
| 2013/0043438 | A1 | * | 2/2013 | Moss ..................... C08G 18/10 252/511 |
| 2015/0057388 | A1 | | 2/2015 | Egbers et al. |

FOREIGN PATENT DOCUMENTS

| EP | 0220411 A1 | 5/1987 |
| WO | 2007/090755 A1 | 8/2007 |
| WO | 2011/119329 A2 | 9/2011 |

\* cited by examiner

*Primary Examiner* — Michael L Leonard
(74) *Attorney, Agent, or Firm* — Whyte Hirschboeck Dudek S.C.

(57) ABSTRACT

A fire retardant and antistatic polyurethane elastomer free of mercury and having a Shore A hardness of at least 30 is prepared from a polyol component and a prepolymer (e.g., an isocyanate) component. The polyol component comprises (A) a saturated polyester polyol of ethylene/butane/adipate of a nominal molecular weight and with a functionality of 2 or more, (B) a polyester polyol of ethylene/trimethylol propane/neopentyl adipate of nominal molecular weight and with a functionality of 2.5 or more, (C) an optional glycol chain extender, (D) an optional polymethyl alkyl siloxane defoamer, (E) an optional desiccant paste, (F) an optional polybutadiene oligomer, (G) an antistatic agent, (H) an optional surface modified fumed silica, (I) tris(2-chloro-1-methylethyl)phosphate flame retardant, (J) ammonium polyphosphate flame retardant, and (K) an organometallic catalyst other than a mercury-based organometallic catalyst, e.g., a tin-based catalyst.

15 Claims, No Drawings

FIRE RETARDANT AND/OR ANTISTATIC, NON-MERCURY CATALYZED POLYURETHANE ELASTOMER

FIELD OF THE INVENTION

This invention relates to polyurethane (PU) elastomers. In one aspect the invention relates to fire retardant (sometimes referred to as flame retardant) and/or antistatic and static dissipative PU elastomers while in another aspect, the invention relates to such PU elastomers made with a non-mercury based catalyst.

BACKGROUND OF THE INVENTION

Polyurethane elastomers provide unique performance in many engineering applications by combining elastomeric properties with high abrasion and tear resistance. One example is the PU elastomer used in the three main elements of a conveyor belt construction, i.e., as a coating for the belt's carcass, as a coating cast on rollers or idlers, and as a material from which to cast/mold conveyor belt scrapers. Originally natural rubber was used in these applications, but that has been superseded by polyvinylchloride (PVC), polyolefins, nitrile and silicone rubbers, and PU elastomers.

The advantage of PU technology in this application comes from its excellent physical properties not the least of which is its exceptional abrasion resistance. In the context of Shore A hardness, especially for a Shore A (ShA) hardness is excess of 65, natural rubber cannot compete with high performance PU elastomer in terms of performance and the life of the cast parts.

While fire retardance is important to many outdoor conveyor belt applications (to reduce the spread of fire in case of roller blockage and burn during the running of the conveyor belt), in underground coal mine applications antistatic properties are also required to prevent any electrical discharge and potential sparking that could be a source of fire or explosion. To meet these requirements PU elastomer are modified with additives responsible for flame retardance and antistatic properties.

Some of these additives may interact with catalyst packages used to make the PU elastomer. One of the most popular catalysts of low sensitivity to these type of additives is mercury-based THORCAT 535. However, mercury-based catalysts are disfavored due to the residual amounts of mercury in the final product that result from their use and as such, non-mercury catalysts are of interest to the manufacturers of PU elastomers. The same is true for lead-based catalysts. While non-mercury and non-lead based catalysts are available for PU elastomer production, many do not exhibit acceptable storage stability when admixed with polyol compositions that contain the additives that are necessary for the desired flame retardance and/or antistatic properties of the final PU elastomer with good mechanical properties acceptable processing parameters of gel or operating time and curing or molding time.

SUMMARY OF THE INVENTION

In one embodiment the invention is a fire retardant and/or antistatic polyurethane elastomer free or substantially free of mercury (also known as non-mercury catalyzed) and having a Shore A hardness of at least 30.

In one embodiment the invention is a polyol composition comprising in weight percent based upon the weight of the composition:

A. 10 to 60% of a saturated polyester polyol of ethylene/butane/adipate of a nominal molecular weight and with a functionality of 2 or more;
B. 40 to 90% of a polyester polyol of ethylene/trimethylol propane/neopentyl adipate of nominal molecular weight and with a functionality of 2.5 or more;
C. 0 to 20% 1,4-butane diol chain extender glycol;
D. 0 to 0.4% polymethyl alkyl siloxane defoamer dissolved in an isoparaffin;
E. 0 to 5% desiccant paste comprising 50 weight percent (wt %) of a zeolite powder suspension in castor oil.
F. 0 to 0.8% polybutadiene oligomer;
G. 0 to 10% antistatic agent;
H. 0 to 0.5% surface modified fumed silica;
I. 5 to 15% tris(2-chloro-1-methylethyl)phosphate flame retardant;
J. 5 to 15% ammonium polyphosphate flame retardant; and
K. 0.002 to 0.1% organometallic catalyst other than mercury- or lead-based organometallic catalyst.

In one embodiment the polyol composition comprises a quaternary ammonium salt of an alkali metal diluted in a trialkyl phosphate or an imidazolium salt as the antistatic agent.

In one embodiment the polyol composition comprises a tin-based organometallic catalyst such as a dialkyltin mercaptide, e.g., di-n-octyltin bis(isooctyl mercaptoacetate), and an imidazolium salt antistatic agent such as an alkyl imidazolium dicyanamide salt, e.g., 1-ethyl-3-methyl imidazolium dicyanamide.

In one embodiment the invention is a process for making a fire retardant and/or static dissipative polyurethane elastomer free or substantially free of mercury and having a Shore A hardness of at least 30, the process comprising the step of contacting at polyurethane reactive conditions (1) A polyol composition comprising in weight percent based upon the weight of the composition:
   A. 10 to 60% of a saturated polyester polyol of ethylene/butane/adipate of a nominal molecular weight and with a functionality of 2 or more;
   B. 40 to 90% of a polyester polyol of ethylene/trimethylol propane/neopentyl adipate of nominal molecular weight and with a functionality of 2.5 or more;
   C. 0 to 20% alkyl diol chain extender glycol;
   D. 0 to 0.4% polymethyl alkyl siloxane defoamer dissolved in an isoparaffin;
   E. 0 to 5% desiccant paste comprising 50 weight percent (wt %) of a zeolite powder suspension in castor oil.
   F. 0 to 0.8% polybutadiene oligomer;
   G. 0 to 10% antistatic agent;
   H. 0 to 0.5% surface modified fumed silica;
   I. 5 to 15% tris(2-chloro-1-methylethyl)phosphate flame retardant;
   J. 5 to 15% ammonium polyphosphate flame retardant; and
   K. 0.002 to 0.1% organometallic catalyst other than mercury-based organometallic catalyst; with (2) A prepolymer composition comprising in weight percent based on the weight of the prepolymer composition:
   L. 10 to 60% of a saturated polyester polyol of ethylene/butane/adipate of a nominal molecular weight and with a functionality of 2 or more;
   M. 30 to 60% diphenylmethane diisocyanate (MDI) containing approximately 97% of 4,4-diphenylmethane diisocyanate isomer and 3% of 2,4-diphenylmethane diisocyanate isomer;
   N. 5 to 15% modified MDI; and
   O. 0 to 0.1% para-nitrobenzoyl chloride.

In one embodiment the process comprises the further step of admixing with the polyol composition and the prepolymer composition and at polyurethane reaction conditions greater than 0 to 20 wt % alkyl diol chain extender.

In one embodiment the process comprises the further step of admixing with the polyol composition and the prepolymer composition and at polyurethane reaction conditions 0.002 to 0.01% organometallic catalyst other than a mercury based organometallic catalyst.

In one embodiment the process comprises the further step of admixing with the polyol composition and the prepolymer composition and at polyurethane reaction conditions both greater than 0 to 20 wt % alkyl diol chain extender and 0.002 to 0.1% organometallic catalyst other than a mercury based organometallic catalyst.

In one embodiment the polyol composition used in the inventive process comprises a quaternary ammonium salt of alkali metal diluted in a trialkyl phosphate or an imidazolium salt as the antistatic agent.

In one embodiment the polyol composition used in the inventive process comprises a tin-based organometallic catalyst such as a dialkyltin mercaptide, e.g., di-n-octyltin bis (isooctyl mercaptoacetate), and an imidazolium salt antistatic agent such as an alkyl imidazolium dicyanamide salt, e.g., 1-ethyl-3-methyl imidazolium dicyanamide.

In one embodiment of the invention, the inventive formulation allows not only obtaining acceptable processing parameters but also improved physical properties. The technology has been designed as a 2-component technology where all polyols, additives, chain extenders and catalysts are blended together to make the polyol component. The prepolymer is the isocyanate component.

In one embodiment the invention is a 3-component technology with the chain extender introduced separately.

In one embodiment the invention is a 4 component technology with the chain extender and catalyst (typically within an inert carrier) introduced as separate components.

These 3- and 4-component embodiments are suitable for advanced multicomponent machines where hardness of cast elastomer can be modified by addition of the chain extender component and reactivity can be adjusted by using the catalyst dissolved in an inert carrier. These third and fourth components can be injected directly into the mixing head or pre-blended with the polyol component together with prepolymer component to produce a simplified two-component version of the system.

DETAILED DESCRIPTION OF THE PREFERRED EMBODIMENT

Definitions

For purposes of U.S. patent practice, all patents, patent applications and other cited documents within this application are incorporated in their entirety herein by reference tp the extent that they are not in conflict with the disclosure of this application.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of a particular component in the composition.

"Elastomer" and like terms mean a rubber-like polymer which can be stretched to at least twice its original length and which retracts very rapidly to approximately its original length when the force exerting the stretching is released. A typical elastomer has an elastic modulus of about 10,000 psi (68.95 MPa) or less and an elongation usually greater than 200% in the uncrosslinked state at room temperature using the method of ASTM D638-72. EP274888.

"Polyurethane reactive conditions" and like terms typically mean a process temperature of 30 to 50° C. and ambient, e.g., atmospheric, pressure for the mixing of the PU elastomer formulation, that is, the making of the isocyanate and polyol components, and then the mixing of the two components with one another. The mold temperature for the PU elastomer article is typically 80 to 110° C. with a curing/molding time of 30 to 90 minutes. Post-cure of the molded article is typically conducted at 80 to 110° C. for greater than zero to 72 hours, more typically 12 to 16 hours. Conditioning time of the molded article is typically 2 to 14 days at ambient temperature (e.g., 23° C.±2° C. for three days).

"Antistatic" and like terms when used to describe a PU elastomer mean a PU elastomer with a surface resistivity of $10^6$ to $10^{12}$ ohms, typically $10^9$ to $10^{12}$ ohms. A PU elastomer is said to be "static dissipative" when it has a surface resistivity of at least $10^6$ ohms, typically $10^6$ to $10^9$ ohms.

"Free of mercury", "substantially free of mercury", "non-mercury catalyzed" and like terms mean that any mercury present in the isocyanate component, polyol component and/or the PU elastomer is present as a contaminant and at only nominal levels, i.e., levels at which it is without any material effect on the flame retardant, antistatic and mechanical properties of the PU elastomer. Such mercury is not intentionally introduced into any of the components used to make the elastomer, and is present, if present at all, as a trace element from one or more of the starting materials used to make the PU elastomer.

Polyurethane Elastomers

The polyurethane elastomers of the invention comprise an isocyanate group-containing component ("isocyanate-terminated component" or simply "isocyanate component" or "prepolymer") and an isocyanate-reactive component ("isocyanate-reactive component" or simply "polyol component"). In certain preferred embodiments, the PU elastomer may be a block copolymer-type elastomer. In order to prepare the polyurethane elastomer, the isocyanate-reactive component must react with the isocyanate-terminated component.

Isocyanate Component

Suitable polyisocyanates may be aliphatic, cycloaliphatic, araliphatic, or aromatic polyisocyanates, or combinations thereof. Such may include, for example, alkylene diisocyanates, particularly those having from 4 to 12 carbon atoms in the alkylene moiety, such as 1,12-dodecane diisocyanate, 2-ethyltetramethylene-1,4-diisocyanate, 2-methyl-pentamethylene-1-diisocyanate, 2-ethyl-2-butylpentamethylene-1, 5-diisocyanate, tetramethylene-1,4-diisocyanate and preferably hexamethylene-1,6-diisocyanate; cycloaliphatic-5-diisocyanates, such as cyclohexane-1,3- and 1,4-diisocyanate and any desired mixture of these isomers, 1-isocyanato-3,3,5-trimethyl-5-isocyanato-methylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, araliphatic diisocyanates, e.g., 1,4-xylylene diisocyanate and xylylene diisocyanate isomer mixtures, and preferably aromatic diisocyanates and polyisocyanates, e.g., 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyiso-cyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of combinations thereof. The isocyanate component is, in certain particular embodiments, desirably a prepolymer, i.e., a urethane-modified polyisocyanate, and in other non-limiting embodiments it is a urethane-modified aromatic polyisocyanate such as a prepolymer prepared from 4,4'-diphenylmethane diisocyanate.

The organic polyisocyanates may be prepared by known processes. They are preferably prepared by phosgenation of the corresponding polyamines with formation of polycarbamoyl chlorides, followed by thermolysis of the polycarbamoyl chlorides to produce the organic polyisocyanate and hydrogen chloride. Alternatively, they may be prepared by phosgene-free processes, such as, for example, by reacting the corresponding polyamines with urea and alcohol to give polycarbamates, followed by thermolysis of the polycarbamates to produce the polyisocyanate and alcohol.

Where the polyisocyanates are to be modified, groups such esters, ureas, biurets, allophanates, uretoneimines, carbodiimides, isocyanurates, uretidiones and/or urethanes are added thereto. One example product is a urethane-containing organic, preferably aromatic, polyisocyanate containing from 33.6 to 15 percent by weight, preferably from 31 to 21 percent by weight, of isocyanate (NCO), based on the total weight. Preparation begins with 4,4'-diphenylmethane diisocyanate, 4,4'- and 2,4'-diphenylmethane diisocyanate mixtures, or crude MDI or 2,4- or 2,6-tolylene diisocyanate, which are then modified by means of reaction with diols, triols, 5 dialkylene glycols, trialkylene glycols or polyoxyalkylene glycols having molecular weight of up to 6,000. Specific examples of di- and polyoxyalkylene glycols, which may be employed individually or as mixtures for this purpose, are diethylene, dipropylene, polyoxyethylene, polyoxypropylene and polyoxypropylenepolyoxyethylene glycols, triols and/or tetrols. NCO-containing prepolymers containing 10 from 25 to 3.5 percent by weight, preferably from 21 to 14 percent by weight, of NCO, based on the total weight, may be prepared from the polyether polyols described above reacted with 4,4'-diphenylmethane diisocyanate, mixtures of 2,4'- and 4,4'-diphenylmethane diisocyanate, 2,4- and/or 2,6-tolylene diisocyanates or crude MDI. Furthermore, liquid polyisocyanates containing carbodiimide groups and/or 15 isocyanurate rings and containing from 33.6 to 15 percent by weight, preferably from 31 to 21 percent by weight, of NCO, based on the total weight, e.g., based on 4,4'-, 2,4'- and/or 2,2'-diphenylmethane diisocyanate and/or 2,4' and/or 2,6-tolylene diisocyanate, may also be selected.

The modified polyisocyanates may be mixed with one another or with unmodified organic polyisocyanates, such as, for example, 2,4'- or 4,4'-diphenylmethane diisocyanate, crude MDI, and/or 2,4- and/or 2,6-tolylene diisocyanate. An isocyanate component frequently employed in the shoe sole industry may be prepared by reacting a monomeric 4,4'-methane-diisocyanate; an ethylene oxide-capped diol having a molecular weight of 4000; an ethylene oxide-capped triol having a molecular weight of 6000; and a second chain extender including, dipropylene glycol, tripropylene glycol, or a mixture thereof; under conditions suitable to form a prepolymer. This prepolymer is then reacted with a polyol component and a blowing agent to make the final polyurethane foam.

Organic polyisocyanates which may also be particularly successful may further include mixtures of modified organic polyisocyanates containing urethane groups, having an NCO content of from 33.6 to 15 percent by weight, in particular those based on tolylene diisocyanates, 4,4'-diphenylmethane diisocyanate, diphenylmethane diisocyanate isomer mixtures or crude MDI, in particular 4,4'-, 2,4'- and 2,2'-diphenylmethane diisocyanate, polyphenyl-polymethylene polyisocyanates, 2,4- and 2,6-tolylene diisocyanate, crude MDI having a diphenylmethane diisocyanate isomer content of from 30 to 80 percent by weight, preferably from 35 to 45 percent by weight, and mixtures of at least two of the above-indicated polyisocyanates, for example, crude MDI or mixtures of tolylene diisocyanates and crude MDI.

Polyol Component

The second major component of the inventive elastomer formulation is an isocyanate-reactive component or polyol component. This may include one or more materials containing terminal groups that react with isocyanate groups, including but not limited to hydroxyl groups, amine groups; thiol groups; sulfhydryl groups; and combinations and hybrid species thereof. The isocyanate-reactive component is generally termed, for convenience as well as convention, as the "polyol," regardless of whether a formulation contains only one compound, or two or more compounds. In certain embodiments the polyol has a functionality of from 2 to 8, preferably from 2 to 4. Viscosity may vary according to dictates relating to formulation, availability, practicality, and/or equipment.

Examples of the polyols which may be included in the system are polyether polyols, polyester polyols, polyamines, polyether-ester polyols, polycaprolactones, polycarbonates, copolymers thereof, and combinations thereof. Other examples may include polythio-ether-polyols, polyesteramides, hydroxyl-containing polyacetals and hydroxyl-containing aliphatic polycarbonates. Other selections may include mixtures of at least two of the above-mentioned polyhydroxyl and polyamine compounds.

Suitable polyester polyols may be prepared from, for example, organic dicarboxylic acids having from about 2 to about 12 carbon atoms, preferably aromatic dicarboxylic acids having from 8 to 12 carbon atoms and polyhydric alcohols, preferably diols having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, and preferably phthalic acid, isophthalic acid, terephthalic acid and the isomeric naphthalene-dicarboxylic acids. The dicarboxylic acids may be used either individually or mixed with one another. The free dicarboxylic acids may also be replaced by the corresponding dicarboxylic acid derivatives, for example, dicarboxylic esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and adipic acid, and in particular mixtures of phthalic acid and/or phthalic anhydride and adipic acid, mixtures of phthalic acid or phthalic anhydride, isophthalic acid and adipic acid or dicarboxylic acid mixtures of succininc acid, glutaric acid and adipic acid and mixtures of terephthalic acid and adipic acid or dicarboxylic acid mixtures of succinic acid, glutaric acid and adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., e-caprolactone or hydroxycarboxylic acids, e.g., w-hydroxycaproic acid and hydrobenzoic acid, may also be employed.

The polyester polyols may be prepared by polycondensing the organic, e.g., aliphatic and preferably aromatic polycarboxylic acids and mixtures of aromatic and aliphatic polycarboxylic acids, and/or derivatives thereof, and polyhydric alcohols without using a catalyst or preferably in the presence of an esterification catalyst, expediently in an inert gas atmosphere, e.g., nitrogen, carbon monoxide, helium, argon, inter alia, in the melt at from about 150° C. to about 250° C., preferably from 180° C. to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 0.5 bar (50,000 N/m$^2$), preferably from 0.05 bar to 0.150 bar (5,000 N/m$^2$ to 15,000 N/m$^2$), until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g., benzene, toluene, xylene or chlorobenzene, for removal of the water of condensation by azeotropic distillation.

The polyester polyols are advantageously prepared by polycondensing the organic polycarboxylic acids and/or derivatives thereof with polyhydric alcohols in a molar ratio of from 1:1 to 1:1.8, preferably from 1:1.05 to 1:1.2. The polyester polyols preferably have a functionality of from 2 to 3 and a hydroxyl number of from 150 to 600, in particularly, from 200 to 400.

One group of readily available polyhydroxyl compounds includes the polyether polyols. These may be prepared by known processes, for example, by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalyst and with addition of at least one initiator molecule containing from 2 to 8, preferably 3 to 8, reactive hydrogen atoms in bound form or by cationic polymerization using Lewis acids, such as antimony pentachloride, boron trifluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other, or as mixtures. Examples of suitable initiator molecules are water, organic dicarboxylic acids such as succinic acid, adipic acid, phthalic acid and terephthalic acid, and a variety of amines, including but not limited to aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylene-diamine, 1,3- and 1,4-butylene diamine, 1,2-, 1,3-, 1,4-, 1,5- and 1,6-hexamethylene-diamine, aniline, phenylenediamines, 2,3-, 2,4-, 3,4- and 2,6-tolylenediamine and 4,4'-, 2,4'- and 2,2'-diaminodiphenylmethane.

Other suitable initiator molecules are alkanolamines, e.g., ethanolamine, N-methyl- and N-ethylethanolamine, dialkanolamines, e.g., diethanolamine, N-methyl and N-ethyldiethanolamine, and trialkanolamines, e.g., triethanolamine, and ammonia, and polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols, for example, 4,4'-dihydroxy-diphenylmethane and 4,4',5-dihydroxy-2,2-diphenylpropane, resols, for example, oligomeric products of the condensation of phenol and formaldehyde, and Mannich condensates of phenols, formaldehyde and dialkanolamines, and melamine.

It is advantageous in some embodiments that the polyols included in the polyol system are polyether polyols having a functionality of from 2 to 8 and a hydroxyl number of from 100 to 850 prepared by anionic polyaddition of at least one alkylene oxide, preferably ethylene oxide or 1,2-propylene oxide or 1,2-propylene oxide and ethylene oxide, onto, as initiator molecule, at least one aromatic compound containing at least two reactive hydrogen atoms and containing at least one hydroxyl, amino and/or carboxyl group. Examples of such initiator molecules are aromatic polycarboxylic acids, for example, hemimellitic acid, trimellitic acid, trimesic acid and preferably phthalic acid, isophthalic acid and terephthalic acid, or mixtures of at least two said polycarboxylic acids, hydroxycarboxylic acids, for example, salicylic acid, p- and m-hydroxybenzoic acid and gallic acid, aminocarboxylic acids, for example, anthranilic acid, m- and p-aminobenzoic acid, polyphenols, for example, resorcinol, and preferably dihydroxydiphenyl-methanes and dihydroxy-2,2-diphenyl-propanes, Mannich condensates of phenols, formaldehyde and dialkanolamines, preferably diethanolamine, and preferably aromatic polyamines, for example, 1,2-, 1,3- and 1,4-phenylenediamine and in particular 2,3-, 2,4-, 3,4- and 2,6-tolylenediamine, 4,4'-, 2,4'- and 2,2'-diamino-diphenylmethane, polyphenyl-polymethylene-polyamines, mixtures of diamino-diphenylmethanes and polyphenyl-polymethylene-polyamines, as formed, for example, by condensation of aniline with formaldehyde, and mixtures of at least two of said polyamines.

The preparation of polyether polyols using at least difunctional aromatic initiator molecules of this type is known and described in, for example, DD-A-290 201; DD-A-290 202; DE-A-34 12 082; DE-A-4 232 970; and GB-A-2,187,449.

The polyether polyols preferably have a functionality of from 3 to 8, in particular from 3 to 7, and hydroxyl numbers of from 120 to 770, in particular from 200 to 650. Other suitable polyether polyols are melamine/polyether polyol dispersions as described in EP-A 23 987 (U.S. Pat. No. 4,293, 657), polymer/polyether polyol dispersions prepared from polyepoxides and epoxy resin curing agents in the presence of polyether/polyols, as described in DE 29 43 689 (U.S. Pat. No. 4,305,861), dispersions of aromatic polyesters in polyhydroxyl compounds, as described in EP-A-62 204 (U.S. Pat. No. 4,435,537) and DE-A 33 00 474, dispersions of organic and/or inorganic fillers in polyhydroxyl 10 compounds, as described in EP-A-11 751 (U.S. Pat. No. 4,243,755), polyurea/polyether-polyol dispersions, as described in DE-A-31 25 402, tris(hydroxyalkyl) isocyanurate/polyether-polyol dispersions, as described in EP-A-136 571 (U.S. Pat. No. 4,514,426), and crystallite suspensions, as described in DE-A-33 42 176 and DE-A-33 42 177 (U.S. Pat. No. 4,560,708). Other types of dispersions that may be useful in the present invention include those wherein nucleating agents, such as liquid perfluoroalkanes and hydrofluoroethers, and inorganic solids, such as unmodified, partially modified and modified clays, including, e.g., spherical silicates and aluminates, flat laponites, montmorillonites and vermiculites, and particles comprising edge surfaces, such as sepiolites and kaolinite-silicas. Organic and inorganic pigments and compatibilizers, such as titanates and siliconates, may also be included in useful polyol dispersions.

Like the polyester polyols, the polyether-polyols may be used individually or in the form of mixtures. Furthermore, they may be mixed with the graft polyether polyols or polyester polyols and the hydroxyl-containing polyester-amides, polyacetals, polycarbonates and/or phenolic polyols.

Examples of suitable hydroxyl-containing polyacetals are the compounds which may be prepared from glycols, such as diethylene glycol, triethylene glycol, 4,4'-dihydroxyethoxy-diphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g., diphenyl carbonate, or phosgene.

The polyester-amides include, for example, the predominantly linear condensates obtained from polybasic, saturated and/or unsaturated carboxylic acids or 5 anhydrides thereof and polyhydric, saturated and/or unsaturated amino alcohols, or mixtures of polyhydric alcohols and amino alcohols and/or polyamines.

Suitable compounds containing at least two reactive hydrogen atoms are furthermore phenolic and halogenated phenolic polyols, for example, resol-polyols containing benzyl ether groups. Resol-polyols of this type can be prepared, for example, from phenol, formaldehyde, expediently paraformaldehyde, and polyhydric aliphatic alcohols. Such are described in, for example, EP-A-0 116 308 and EP-A-0 116 310.

In certain preferred embodiments, the isocyanate-reactive component may include a mixture of polyether polyols containing at least one polyether polyol based on an aromatic, polyfunctional initiator molecule and at least one polyether polyol based on a non-aromatic initiator molecule, preferably a trihydric to octahydric alcohol.

Catalysts

In order to expedite and facilitate the elastomer-forming reaction, one or more catalysts are desirably included in the formulation. Where a foam is being prepared, it may be desirable to include, in particular, a catalyst that favors the urea (blowing) reaction. Examples of such catalysts may include bis-(2-dimethylaminoethyl)ether; tris(dialkylaminoalkyl)-s-hexahydrotriazines such as 1,3,5-tris-(N,N-dimethylaminopropyl)-s-hexahydrotriazine; penta-methyldiethylenetriamine; tetra-alkylammonium hydroxides such as tetra-methylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, in some embodiments, pendant hydroxyl groups. In one embodiment, a combination of bis(dimethylaminoethyl)ether and dipropylene glycol may be an effective blowing catalyst, for example, in a 70/30 weight percent ratio. Combinations of any of the above may also be selected.

Examples of suitable catalysts that may tend to favor the urethane (gel) reaction, which may be particularly useful for both foamed and non-foamed formulations, include, generally, amidines, tertiary amines, organometallic compounds, and combinations thereof. These may include, but are not limited to, amidines such as 1,8-diazabicyclo[5.4.0]undec-7-ene and 2,3-dimethyl-3,4,5.6-tetrahydropyrimidine, and tertiary amines such as triethylamine, tributylamine, dimethylbenzylamine, N-methyl-, N-ethyl-, and N-cyclohexylmorpholine, N,N,N',N-tetra-methylethylenediamine, N,N,N',N'-tetramethyl-butanediamine and -hexanediamine, pentamethyldiethylenetriamine, tetramethyldiaminoethyl ether, bis(dimethylaminopropyl)urea, dimethylpiperazine, dimethylcyclohexylamine, 1,2-dimethyl-imidazole, 1-aza-bicyclo[3.3.0]octane, and, in some preferred embodiments, 1,4-diaza-bicyclo12.2.21octane. Alkanolamine compounds, such as triethanolamine, triisopropanolamine, N-methyl- and N-ethyldiethanolamine, and dimethylethanolamine may also be selected. Combinations of any of the above may also be effectively employed.

While the catalysts described above will promote urethane formation, the majority do not have acceptable storage stability in the presence of fire retardants and/or antistatic additives or if they have acceptable stability, then do not provide a commercially acceptable processing time together with a commercially acceptable demold time. In other words, many of these catalysts do not provide a delayed action curing profile necessary for a relatively long operating time (e.g., the time required for filling the mold) and a relatively fast end-curing (the time required before the cured elastomer can be removed from the mold).

The most promising catalysts in terms of stability are organometallic compounds based on zinc, bismuth, tin, titanium, copper and zirconium with the tin compounds showing the most promise. These organometallic compounds include tin (II) salts of organic carboxylic acids, e.g., tin(II) diacetate, tin(II) dioctanoate, tin(II) diethylhexanoate, tin(II) dilaurate, and dialkyltin(IV) salts of organic carboxylic acids, e.g., dibutyltin diacetate, dibutyltin dilaurate, dibutyltin maleate and dioctyltin diacetate. Particularly preferred is a tin thioglycolate (e.g., dioctyltin mercaptide such as FOMREZ UL 29 (di-n-octyltin his (isooctyl mercaptoacetate) available from Momentive). Bismuth salts include, for example, bismuth octanoate. The organometallic compounds based on zinc, titanium, copper and zirconium may also be useful. The organometallic catalysts may be used alone or in combinations, or, in some embodiments, in combination with one or more of the highly basic amines listed above.

Because of the known toxicity of mercury- and lead-based materials, as well as the disposal challenges and, in some countries, hazardous material classifications of these materials, the organometallic compounds useful in this invention specifically exclude those based on mercury or lead, such as the mercury carboxylates including, but not limited to, phenylmercuric neodeconate.

In one embodiment, the tin-based catalyst FOMREZ UL 29 in combination with optimal functionality and crosslinking density of a polyol composition (obtained by using a combination of two specific polyester polyols of nominal functionalities 2.0 and 2.5 at a ratio of 1:1) and optimal reactivity of prepolymer with NCO not greater than 21% (preferably 10-20%) allowed obtaining a desirable delay action curing profile and relatively short molding time in wide range of hardnesses (e.g., 70-95 ShA).

Storage stability of this catalyst (described as reactivity retention within specification after certain period of storage at recommended conditions, e.g. 6 or 12 months at 0° C.-30° C.) in polyol composition containing flame retardants and antistatic additive, although acceptable, is limited at the elevated temperatures employed by some end users for longer periods of time to melt the material and pre-heat the material to processing temperatures, e.g. >45° C. for longer than 48 hours. Combining this catalyst with an imidazolium salt based antistatic agent showed synergistic effect resulting in reactivity increase coupled with improved storage stability at elevated temperature.

Additives

In addition to the previously discussed components, the formulation may include additional, optional components. Among these may be chain extenders and/or crosslinking agents, which, unlike the polyols, are not polymers in their own right. Chain extenders are used to join together lower molecular weight polyurethane chains in order to form higher molecular weight polyurethane chains, and are generally grouped as having a functionality equal to 2. Crosslinking agents serve to promote or regulate intermolecular covalent or ionic bonding between polymer chains, linking them together to create a more rigid structure. The crosslinking agents are generally grouped as having a functionality of more than 2. Both of these groups are usually represented by relatively short chain or low molecular weight molecules such as hydroquinone di(β-hydroxyethyl)ether, natural oil polyols (NOP) containing reactive hydroxyl groups, such as castor oil, glycerine, ethylene glycol (EG), diethylene glycol (DEG), triethylene glycol, tetraethylene glycol, propylene glycol, dipropylene glycol, tripropylene glycol, 1,3-propanediol, 1,3-butanediol, 1,4-butanediol (BDO), neopentyl glycol, 1,6-hexanediol, 1,4-cyclo-hexanedimethanol, ethanolamine, diethanolamine, methyldiethanolamine, phenyldiethanolamine, glycerol, trimethylolpropane (TMP), 1,2,6-hexanetriol, triethanol-amine, pentaerythritol, N,N,N', N'-tetrakis(2-hydroxypropyl)-ethylenediamine, diethyl-toluenediamine, dimethylthiotoluenediamine, combinations thereof, and the like. Particularly frequently used are 1,4-butanediol (BDO), diethylene glycol (DEG), glycerine, 1,4-trimethylolpropane (TMP), and combinations thereof. Some molecules may contribute to both chain extension and crosslinking. Those skilled in the art will be familiar with a wide range of suitable chain extenders and/or crosslinking agents.

Additional formulation components may optionally be included, according to the desire of the practitioner. Such may include, in non-limiting embodiments, antistatic agents, pigments and colorants; flame retardants; antioxidants; surface modifiers; surfactants; bioretardant agents; mold release agents; viscosity modifiers; plasticizers; and combinations thereof.

In forming the elastomers of the invention, typically the prepolymer component is formed first. Reacting a polyol (i.e., a part of the isocyanate-reactive component) with an excess of isocyanate component (which, in preferred embodiments, is all of the isocyanate component) produces a prepolymer having free terminal isocyanate groups, which may then be reacted with the remainder of the isocyanate-reactive component. A quasi-prepolymer is formed when the stoichiometric ratio of isocyanate groups to hydroxyl or amine groups is greater than 2:1. A true prepolymer is formed when the stoichiometric ratio is equal to 2:1.

Once the formulation components have been mixed, they are introduced into a mold or cavity, or onto a substrate, in any way known in the art to produce a polyurethane elastomer or polyurethane foam. In certain applications foaming may be carried out under conditions suitable to ensure that the final product is a particular type of foam, such as a microcellular foam or a slabstock or molded closed- or open-celled foam. Those skilled in the art will be aware of various types of apparatus to accomplish the contact while ensuring that an adequate level of mixing occurs to ensure uniformity of the final elastomer. One way to do this is to use a mixing injection head, wherein the two "sides" of the formulation (the isocyanate-terminated prepolymer and the remaining isocyanate-reactive component) are combined and mixed and then, more or less simultaneously, injected into the mold or cavity to be filled. The so-called "one shot" injection, wherein the mold or cavity is filled from a single injection point while simultaneously drawing a vacuum from another point, may be particularly desirable. Where a mold is used, demolding may be carried out using standard methodologies, and where desirable, suitable external and/or internal mold release agents may be employed.

The final polyurethane elastomer desirably exhibits various desirable properties, such as, for example, for an elastomer having a density of 1.23 grams per milliliter (g/mL): a Shore A hardness of from 70 to 80; a 100% modulus of at least 3.5 megapascals (MPa); a 300% modulus of at least 7.5 MPa; a tensile strength of at least 20 MPa; an elongation at break of at least 400%; a nicked crescent tear strength of at 25 least 30 newtons per millimeter (N/mm); a split tear strength of at least 9 N/mm; a compression set after 22 hours at 70° C. of at least 30%; an abrasion of less than 80 1 cubic millimeters (mm) loss; a flame retardance of "Pass V0" (6 mm sample; and/or a rebound resilience of at least 28%. Test values provided in this paragraph are based on the standards protocols identified in Table 5.

Formulations

In one embodiment of the invention, the polyol component comprises in weight percent based upon the weight of the composition:

A. 10 to 60%, preferably 30 to 40%, of a saturated polyester polyol of ethylene/butane/adipate with a molecular weight of 2,000 g/mol and a functionality of 2 or more, e.g., DIOREZ 750 available from The Dow Chemical Company;

B. 40 to 90%, preferably 30 to 40%, of a polyester polyol of ethylene/trimethylol propane/neopentyl adipate with a molecular weight of 2,300 g/mol and a functionality of 2.5 or more, e.g., BESTER 90 available from The Dow Chemical Company;

C. 0 to 20% 1,4-butane diol chain extender glycol;

D. 0 to 0.4%, preferably 0.1 to 0.4% and more preferably 0.25 to 0.35%, polymethyl alkyl siloxane defoamer dissolved in an isoparaffin, e.g., BYK 088 available from BYK Chemie;

E. 0 to 5%, preferably 1 to 5% and more preferably 2 to 3%, desiccant paste comprising 50 weight percent (wt %) of a zeolite powder (molecular sieve of about 3 angstroms (Å) suspension in castor oil, e.g., available from UOP;

F. 0 to 0.8%, preferably 0.4 to 0.8% and more preferably 0.5 to 0.6%, polybutadiene oligomer with a molecular weight of 9,000 g/mol, e.g., LITHENE N4/9000 available from Synthomer;

G. 0 to 10%, preferably 1 to 5%, more preferably 2 to 3%, of an antistatic agent such as a quaternary ammonium salt of an alkali metal diluted in a trialkyl (e.g., triethyl)phosphate, e.g., CATAFOR MS/T available from Rhodia, or an imidazolium salt such as an alkyl (e.g., 1-ethyl-3-methyl) imidazolium dicyanamide, e.g., BASIONICS VS 03 from BASF (in flame retardant formulations, the amount of antistatic agent is typically zero);

H. 0 to 0.5%, preferably 0.1 to 0.5% and more preferably 0.1 to 0.2%, e.g., CABOSIL TS610, surface modified fumed silica;

I. 5 to 15%, preferably 5 to 10%, tris(2-chloro-1-methylethyl)phosphate flame retardant, e.g., FYROL PCF-TCPP available from ICL;

J. 5 to 15%, preferably 5 to 10%, ammonium polyphosphate flame retardant, e.g., EXOLIT AP422 available from Clariant; and K. 0.002 to 0.01%, preferably 0.003 to 0.005%, organometallic catalyst other than a mercury- or lead-based organometallic catalyst, e.g., FOMREZ UL29 available from Witco.

The presence of ethylene/trimethylol propane/neopentyl adipate (e.g., BESTER 90) in the formulation provides improved processing and acceptable demolding time as compared to a formulation alike in all aspects except for the ethylene/trimethylol propane/neopentyl adipate replaced with additional DIOREZ 750. The 1,4-butane diol chain extender can be included in the formulation directly, or added separately at the time the polyol composition is admixed with the prepolymer composition. The 1,4-butane diol extender contributes to a hardness of the final elastomer, typically a hardness of 30 to 95 Shore A, or of 50 to 95, or of greater than 70 to 95 Shore A. Other chain extenders that can be used in this particular formulation as a substitute for or in combination with 1,4-butane diol include monoethylene glycol and 1,3-propanediol. The chain extender is excluded from the polyol composition only if it is added separately as in the three or four component technology of this invention.

The polymethyl alkyl siloxane defoamer assists in removing air from the composition during degassing under vacuum in a machine tank or in a separate vacuum chamber (hand cast technique) and in the mold, while the desiccant paste assists in removing residual moisture in the composition, i.e., it acts as a drying agent.

The quaternary ammonium salt or imidazolium salt acts as an antistatic agent and serves as a substitute for carbon black that typically contributes to significant viscosity increase making processing and mixing more difficult. Further description of the quaternary ammonium salts and imidazolium salts that can be used in the practice of the invention can be found in WO 2007/090755 and references cited therein. Total antistatic additive loading in the final elastomer is typically between 1.2 and 2 wt % to meet the requirement of Surface and Volume resistivities below 9×10^8 Ohm.

The modified fumed silica acts a as thixotropic agent, and the tris(2-chloro-1-methylethl)phosphate and ammonium polyphosphate flame retardants act synergistically so at least in this particular formulation, the same amount of the two together provides more of flame retardance than that provided by an equivalent amount of either one alone. Other flame retardants that can be used in this formulation include various halogenated materials such as brominated aromatic and aliphatic reactive and non-reactive materials, e.g., SAYTEX RB79 available from Albemarle and FR 522 available from ICL. Halogen-free flame retardants can also be used in this formulation such as FYROL PNX and FYROL TEP (both phosphorus based). Total flame retardant additives loading in the final elastomer is typically between 5.5 and 9.5 wt % so as to meet requirements for Oxygen Index in the range of 27% to 29% and to pass V-0 flammability test according to UL-94 Standard.

In this formulation, the tin thioglycolate catalyst is not only demonstrates desirable storage stability as part of the polyol mix, but also demonstrates a desirable delayed reaction time to allow for easy filling of the molds and a fast cure upon completion of the mold fill to allow for a relatively short demolding time. Total catalyst loading in the polyol component is typically between 0.003 and 0.005 wt % to meet processing requirements of 5-7 minutes gel time and 30-60 minutes demold time for all hardnesses in range of 70 to 95 Shore A.

In one embodiment of the invention, the prepolymer component comprises in weight percent based upon the weight of the composition:

L. 10 to 60%, preferably 40 to 50%, of a saturated polyester polyol of ethylene/butane/adipate of a saturated polyester polyol of ethylene/butane/adipate with a molecular weight of 2,000 g/mol and a functionality of 2 or more, e.g., DIOREZ 750 available from The Dow Chemical Company;

M. 30 to 60%, preferably 40 to 50%, diphenylmethane diisocyanate (MDI) containing approximately 97% of 4,4-diphenylmethane diisocyanate isomer and 3% of 2,4-diphenylmethane diisocyanate isomer, e.g., ISONATE M125 U MDI available from The Dow Chemical Company;

N. 5 to 15%, preferably 8 to 12%, modified MDI, e.g., ISONATE M143 available from The Dow Chemical Company; and O. 0 to 0.1%, preferably 0.001 to 0.01%, para-nitrobenzoyl chloride, e.g., para-nitrobenzoyl chloride, pNBC available from Sigma-Aldrich.

The ISONATE M143 acts as a crystallization inhibitor, and the pNBC acts as a side reaction inhibitor. The prepolymer component useful in this technology typically does not contain more than 20% of reactive NCO groups and not more than 10% of modified MDI, e.g., ISONATE M143, to keep the reactivity profile at an acceptable level.

The catalyst is typically diluted in an inert carrier, and can be used as a separate component, e.g., the fourth component of the 4-component technology, useful for adjusting the reactivity of the system. Tris(2-chloro-1-methylethyl)phosphate (TCPP) and/or MESAMOLL (a phthalate-free, alkylsulphonic acid ester with phenol plasticizer) can be used as inert carriers where TCPP offers additional flame retardance performance. A blend of 0.095 wt % FOMREZ UL29 in TCPP demonstrates good miscibility, stability over 6 months at room temperature and improved catalyst's distribution in the system. This approach can be utilized during manufacturing of a polyol blend where small loadings of catalyst can be easier controlled when it's diluted in a carrier. For instance, a 1 wt % solution of FOMREZ UL29 in TCPP is easier to handle and improves the catalysts distributions in the polyol composition.

In one embodiment, 1,4-butanediol is preblended in the polyol component. In one embodiment, 1,4-butancediol is not preblended in the polyol component, but rather is introduced as separate component in the 3- or 4-component technology which can allow for a more full range of ShA hardness.

Optimal crosslinking density is related to the ratio between the two main polyester polyols:linear (DIOREZ 750, theoretical functionality=2.0) and branched (BESTER 90, theoretical functionality=2.5). The ratio 1:1 by weight between these two polyester polyols has been found optimal in terms of curing profile and physical properties for the particular formulations described above.

In one embodiment the PU elastomer contains carbon black. In one embodiment the PU elastomer does not contain carbon black and in this embodiment, lends itself well to coloration by other pigments.

In one embodiment the PU elastomer is made with a polyol composition comprising 1-ethyl-3-methyl imidazolium dicyanamide as the antistatic agent and di-n-octyltin bis(isooctyl mercaptoacetate) as the organometallic catalyst. This combination of antistatic agent and catalyst demonstrates a surprising synergy in terms of catalyst activity in the manufacture of the PU elastomer and catalyst stability in the polyol composition at elevated temperatures both during processing and storage.

SPECIFIC EMBODIMENTS

Comparative Example

Commercial Product Comprising DIPRANE 64, Mercury-Catalyzed, Antistatic and Flame Retarded Polyurethane Elastomer The 2-component version consists of a polyol component and an isocyanate component. The polyol component contains all the polyols, additives (including flame retardants, antistatic agent, etc.), catalyst and optionally chain extender blended together. The isocyanate component is a MDI prepolymer (where one of the polyols is completely reacted with excess of MDI) blended with liquefied MDI.

The ingredients of the polyol component are typically blended using a drum roller operated for 40-60 minutes at 20-25 revolutions per minute (rpm) or a drill mixer operated for about 15 minutes. Strong turbulence and mixing with air is kept to a minimum. The blending is conducted at a temperature of 45-55° C. The isocyanate component is blended at a temperature of 40-50° C. The chain extender, if added separate from the polyol component, is typically maintained at a temperature of 25-30° C.

After mixing the two components together, a chemical reaction between all active groups of the polyol component (mainly hydroxyl groups) and NCO groups of prepolymer and monomeric MDI begins. The mixing can be by hand or by machine. If by machine, the mixing is conducted consistent with the operating instructions for the equipment and the resulting reaction mixture fed into a heated mold (e.g., 80-90° C.) that has been treated with a mold release agent. If by hand, the components are warmed to the recommended temperatures described above, the required quantities of the polyol and chain extender poured into a mixing bowl and mixed, the required quantity of prepolymer is then added to the mixing bowl and mixed thoroughly with the blend of polyol and chain extender (e.g., for one minute), the resulting mixture is subjected to a vacuum (e.g., 5 torr for 1-2 minutes), and then the reaction mixture is poured into a heated mold (e.g., 80-90° C.) that has been treated with a mold release agent.

The results of the chemical reactions is that the temperature and viscosity of mixed composition begin to rise. For a certain period of time (called the operating time or pot life), the composition stays liquid and pourable. Partially reacted/cured material eventually becomes solid (called the demold time) at which time it can be safely removed from the mold without breaking or distortion. At this stage the elastomer is strong enough to withstand tensions related to the demolding operation. In jargon language it means that the 'green strength' of the elastomer is strong enough to allow the elastomer to be demolded.

In a 3-component version of this type of system chain extender in addition to that already in the polyol is added as a separate component. By adjusting the loading of the chain extender in this manner and re-calculating ratios between all three components, i.e., polyol, isocyanate and chain extender, a processor can obtain elastomers of a wide range of Shore A hardness and other mechanical properties by blending the three components of the system.

Inventive Example 1

DIPRANE 640, Non-Mercury Catalyzed, Antistatic and Flame Retardant Polyurethane Elastomer The procedure of the Comparative Example is repeated except that the Hg-catalyzed DIPRANE 64/70 is replaced with the non-Hg catalyzed DIPRANE 640 (the mercury-based catalyst is replaced with a tin-based catalyst). Table 1 reports the polyol and prepolymer formulations used in both the comparative and inventive examples. Table 2 reports the physical properties of the comparative PU elastomer product with that of the inventive PU elastomer product made using both a 2-component hand mixed procedure and a 3-component machine mixed procedure.

TABLE 1

Comparative and Inventive Polyol and Prepolymer Formulations

| Polyol Component | Comparative Example DIPRANE 64/70 Polyol (wt %) | Inventive Sample DIPRANE 640/70 Polyol (wt %) | Description |
|---|---|---|---|
| DIOREZ 750 | 36.565 | 36.1 | Linear polyester polyol: MEG/Butanediol/Adipate, functionality: 2. |
| DIOREZ PR3 | 36.565 | 0 | Branched polyester polyol: MEG/Propane diol/TMP/Adipate, functionality: 2.2 (provides low reactivity). |
| BESTER 9 | 0 | 36.1 | Branched polyester polyol: MEG/NPG/TMP/Adipate (provides high reactivity and higher crosslinking than PR3). |
| 1,4 Butanediol | 7.588 | 6.9 | Chain extender (can be used separately as third component with both D64 and D640 technologies). |
| BYK 085 | 0.16 | 0 | Surfactant defoamer (polymethyl alkyl siloxane). |
| BYK 088 | 0 | 0.3 | Surfactant defoamer. |
| CATAFOR MS/T | 1.997 | 3.3 | Antistatic additive. |
| THORCAT 535 | 0.184 | 0 | Mercury-based catalyst (phenyl mercuric neodecanoate in neodecancic acid). |
| FOMREZ UL 29 | 0 | 0.0035 | Tin-based catalyst (available in a carrier as fourth component). |
| TCPP | 7.588 | 7.5 | Liquid flame retardant (tris(2-chloro-1-methylethyl) phosphate). |

TABLE 1-continued

Comparative and Inventive Polyol and Prepolymer Formulations

| | | | |
|---|---|---|---|
| APP 422 | 7.588 | 7.5 | Solid flame retardant - filler (ammonium polyphosphate). |
| UOP L Paste | 1.597 | 2 | Drying agent (molecular sieves in castor oil). |
| Fumed amorphous silica | 0.168 | 0 | Thixotropic agent (prevents settling of fillers). |
| CABOSIL TS 610 | 0 | 0.18 | Thixotroping agent. |
| LITHENE N4/9000 | 0 | 0.5565 | Anti-abrasion additive (improves abrasion resistance). |
| Prepolymer Component | DIPRANE 54 | DIPRANE 53 | |
| DIPRANE 54 | 100 | | 21.5% NCO Prepolymer containing >10% ISONATE M143* - crystalizaton inhibitor (highly reactive). |
| DIPRANE 53 | | 100 | 16.5% NCO Prepolymer containing <10% of ISONATE M143* (lower reactivity than DIPRANE 54). |

*ISONATE M143 is a modified diisocyanate containing a high percentage of pure diphenyl-methand diisocyanate.

TABLE 2

Comparison of Physical Properties of Machine Cast Commercial and Inventive PU Elastomer Systems

| Physical properties | Standard | Comparative DIPRANE 64/70 (Hg-Catalyst) | Inventive (2-Component) (Hand Mixed) DIPRANE 640/70 (Sn-Catalyst) | Inventive (3-Component) (Machine Mixed) DIPRANE 640/70 (Sn-Catalyst) |
|---|---|---|---|---|
| Hardness [ShA] | BS 2782 Meth 365B | 70 | 68 | 70 |
| Tensile Strength [MPa] | BS 903 Pt A2 | 26 | 25 | 30.1 |
| 100% Modulus [MPa] | BS 903 Pt A2 | 3.5 | 3.0 | 3.2 |
| 300% Modulus [MPa] | BS 903 Pt A2 | 6.8 | 6.5 | 6.9 |
| Elongation [%] | BS 903 Pt A2 | 530 | 556 | 543 |
| Angle Tear Str. [N/mm] | BS 903 Pt A3 | 54 | 51 | 52 |
| DIN Abrasion [mm3] | DIN 53516 | 63 | 29 | 34 |
| Resilience [%] | BS 903 Pt A8 MethB | 42 | 53 | 50 |
| Compression set (22 hrs. at 70 C.) [%] | ASTM D395 | 44 | 25.2 | 25 |
| Oxygen Index [%] | ASTM D 2863-87 | 28.3 | 29.3 | 29.0 |
| Flame Retardance | UL-94 (6 mm) | V-0 | V-0 | V-0 |
| Surface resistivity [Ω] | NCB 158/1980 standard. | $5 \times 10^8$ | $2.5 \times 10^8$ | $<5 \times 10^8$ |
| Volume Resistivity [Ωcm] | BS EN 20284 | $6 \times 10^8$ | $4 \times 10^8$ | $<6 \times 10^8$ |

BS = British Standard
DIN = German Institute for Standardization Standard
ASTM = American Society for Testing Materials Standard
UL = Underwriting Laboratories Test
NCB = National Coal Board
BS EN = British-Adopted European [Committee for Standardization] Standard All the physical properties of elastomer cast from the inventive system are similar or better than those of the commercial product. Resilience and compression set—properties particularly important for dynamic applications like wheels rollers and idlers, are significantly improved. Also abrasion resistance in the inventive system is almost two times better. Moreover, these improvements do not compromise flame retardance and antistatic properties. Table 3 reports the physical properties of the inventive formulation hand-cast using 3-component technology, the formulation adjusted with additional chain extender to obtain higher Shore A hardness. Here too, the physical properties are similar to or superior than those of the comparative formulation reported in Table 2.

The inventive technology of DIPRANE 640 is also be available as a 4-component system (with catalyst in an inert carrier as a separate component) where not only hardness but also reactivity can be adjusted. This approach responds to the trends in the engineering elastomers industry to use multi-component processing machines and polyurethane systems.

TABLE 3

DIPRANE 640/70 3-Component System Hand-Cast at Laboratory Scale

| Physical properties | Standard | 70 | 75 | 80 | 85 | 90 | 95 |
|---|---|---|---|---|---|---|---|
| Hardness [ShA] | BS 2782 Meth 365B | 68 | 74 | 78 | 84 | 88/ 35 ShD | 94/40 ShD |
| Tensile Strength [MPa] | BS 903 Pt A2 | 25 | 25 | 25 | 25.4 | 28.3 | 26.3 |
| 100% Modulus [MPa] | BS 903 Pt A2 | 3.0 | 3 | 3.6 | 4.9 | 6.6 | 8.7 |
| 300% Modulus [MPa] | BS 903 Pt A2 | 6.5 | 6.8 | 7.8 | 9.6 | 11.9 | 14.2 |
| Elongation [%] | BS 903 Pt A2 | 556 | 546 | 589 | 575 | 596 | 574 |
| Angle Tear Str. [N/mm] | BS 903 Pt A3 | 51 | 50 | 56.3 | 68.1 | 90.1 | 99.4 |
| DIN Abrasion [mm3] | DIN 53516 | 29 | — | — | — | — | — |
| Resilience [%] | BS 903 Pt A8 MethB | 53 | 48 | 46 | 45 | 40 | 36 |
| Compression set (22 hrs. at 70° C.) [%] | ASTM D395 | 25.2 | 23.3 | 24.1 | 26.1 | 26.7 | 28.3 |
| Oxygen Index [%] | ASTM D 2863-87 | 29.3 | — | — | — | — | — |
| Flame Retardance | UL-94 (6 mm) | V-0 | V-0 | V-0 | V-0 | V-0 | V-0 |
| Surface resistivity [Ω] | NCB 158/1980 standard. | $2.5 \times 10^8$ | $<5 \times 10^8$ | $<5 \times 10^8$ | $<5 \times 10^8$ | $<5 \times 10^8$ | $<5 \times 10^8$ |
| Volume Resistivity [Ω cm] | BS EN 20284 | $4 \times 10^8$ | $<6 \times 10^8$ | $<6 \times 10^8$ | $<6 \times 10^8$ | $<6 \times 10^8$ | $<6 \times 10^8$ |

ShD = Shore D hardness measured by the protocol of BS 2782.

Inventive Example 2

DIPRANE 640, Non-Mercury Catalyzed, Antistatic and Flame Retardant Polyurethane Elastomer Inventive Example 1 is repeated except that CATAFOR MS/T is replaced with BASIONICS VS 03 (1-ethyl-3-methyl imidazolium dicyanamide from BASF). Table 4 reports the gel and demold time for PU elastomers from the two inventive examples, and these time clearly show the synergistic effect of the imidazolium salt antistatic agent on the activity of tin-based catalyst.

TABLE 4

Effect of Antistatic Agent on Catalyst Activity I

| Property | Inv. Ex. 1 | Inv. Ex. 2 |
|---|---|---|
| Gel Time (min/sec) | 6' | 3' 20''' |
| Demold Time (min/sec) | 50' | 15' |

Inventive Example 2 is repeated except that the catalyst loading is reduced by half. The results are reported in Table 5 and show that the higher activity of the catalyst in the presence of the imidazolium salt antistatic agent allows for a reduction in the amount of catalyst without sacrifice of gel and demold time

TABLE 5

Effect of Antistatic Agent on Catalyst Activity II

| Catalyst loading | 100% | 50% |
|---|---|---|
| Inv. Ex. 1 Quat Salt Antistatic Agent | 1% | — |
| Inv. Ex. 2 Imidazolium Salt Antistatic Agent | — | 1% |

TABLE 5-continued

Effect of Antistatic Agent on Catalyst Activity II

| Catalyst loading | 100% | 50% |
|---|---|---|
| Gel Time (min/sec) | 5' 10'' | 4' 30'' |
| Demold Time (min/sec) | 35' | 25' |

Storage stability of the polyol composition of Inventive Example 1 (quaternary ammonium salt) compared to the polyol composition of Inventive Example 2 (imidazolium salt at 50% of load of quaternary ammonium salt) is reported in Table 6. Gel and demold time and hardness for Shore A are measured and the composition with the imidazolium salt is improved over the composition with the quaternary ammonium salt notwithstanding having less than 50% of the catalyst concentration. The temperature of typical storage conditions is 45° C. but stability at higher temperatures, e.g., 60° C. and 80° C., is desirable for warmer environments and the melting of the polyol composition.

TABLE 6

Storage Stability

| Composition | Storage conditions | Gel Time (min/sec) | Demold Time (min/sec) | Hardness [ShA] after 50 min' at 80° C. |
|---|---|---|---|---|
| Inv. Ex. 1 | 1 day at 45° C. | 5'35'' | 35' | 35 |
| Inv. Ex. 2 | 1 day at 45° C. | 6'35'' | 35' | 45 |
| Inv. Ex. 1 | 2 days at 60° C. | 6'15'' | 40' | 30 |
| Inv. Ex. 2 | 2 days at 60° C. | 6' | 40' | 42 |
| Inv. Ex. 1 | 2 days at 80° C. | 8'15'' | 105' | — |
| Inv. Ex. 2 | 2 days at 80° C. | 6'10'' | 35' | 44 |

The antistatic properties of the PU elastomer are measured and reported in Table 7. These results show that the desired antistatic properties for the finished product are obtained using the imidazolium salt antistatic agent over the quaternary ammonium salt agent notwithstanding less of the former is used than the latter. The typical requirement for antistatic properties of PU elastomers used in coal mine venues is less than $3 \times 10^8$ ohms.

TABLE 7

Antistatic Properties of PU Elastomers

| Antistatic additive | Antistatic additive loading | Surface resistivity | Volume resistivity |
|---|---|---|---|
| Inv. Ex. 1 | 1.73% | $2.1 \times 10^8$ Ω | $2.4 \times 10^8$ Ωcm |
| Inv. Ex. 1 | 1% | $9.77 \times 10^8$ Ω | — |
| Inv. Ex. 2 | 1% | $4.58 \times 10^7$ Ω | — |
| Inv. Ex. 2 | 0.47% | $1.05 \times 10^8$ | $1.7 \times 10^8$ Ωcm |

The synergistic combination of an organometallic catalyst (other than those based on mercury or lead), particularly a tin-based organometallic catalyst such as di-n-octyltin bis (isooctyl mercaptoacetate), and an imidazolium salt antistatic agent, e.g., 1-ethyl-3-methyl imidazolium dicyanamide, provides an improved cure profile for PU elastomers (e.g., longer gel time leading to longer pot life or operation time) coupled with the demold time and higher hardness), improved storage stability of polyol compositions at elevated temperatures, and improved antistatic properties of a PU elastomer that allow for a significant reduction in the use of expensive antistatic agents.

It is specifically intended that the present invention not be limited to the embodiments and illustrations contained herein, but include modified forms of those embodiments including portions of the embodiments and combinations of elements of different embodiments as come within the scope of the following claims.

I claim:

1. A polyol composition comprising in weight percent based upon the weight of the composition:
   A. 10 to 60% of a saturated polyester polyol of ethylene/butane/adipate of a nominal molecular weight and with a functionality of 2 or more;
   B. 40 to 90% of a polyester polyol of ethylene/trimethylol propane/neopentyl adipate of nominal molecular weight and with a functionality of 2.5 or more;
   C. 0 to 20% 1,4-butane diol chain extender glycol;
   D. 0 to 0.4% polymethyl alkyl siloxane defoamer dissolved in an isoparaffin;
   E. 0 to 5% desiccant paste comprising 50 weight percent (wt %) of a zeolite powder suspension in castor oil;
   F. 0 to 0.8% polybutadiene oligomer;
   G. 0 to 10% antistatic agent;
   H. 0 to 0.5% surface modified fumed silica;
   I. 5 to 15% tris (2-chloro-1-methylethyl) phosphate flame retardant;
   J. 5 to 15% ammonium polyphosphate flame retardant; and
   K. 0.002 to 0.1% organometallic catalyst other than mercury- or lead-based organometallic catalyst.

2. The polyol composition of claim 1 in which the 1,4-butane diol chain extender is present in an amount of greater than 0 to 20 wt %.

3. The polyol composition of claim 1 in which the polymethyl alkyl siloxane defoamer is present in an amount of 0.1 to 0.4%.

4. The polyol composition of claim 1 in which the desiccant paste is present in an amount of 1 to 5%.

5. The polyol composition of claim 1 in which the polybutadiene oligomer is present in an amount of 0.4 to 0.8%.

6. The polyol composition of claim 1 in which the surface modified fumed silica is present in an amount of 0.1 to 0.5%.

7. The polyol composition of claim 1 in which the antistatic agent is a quaternary ammonium salt of an alkali metal diluted in a trialkyl phosphate or an imidazolium salt.

8. The polyol composition of claim 7 in which the organometallic catalyst is di-n-octyltin bis (isooctyl mercaptoacetate).

9. The polyol composition of claim 8 in which the antistatic agent is 1-ethyl-3-methyl imidazolium dicyanamide.

10. A process for making a fire retardant and static dissipative polyurethane elastomer free of mercury and having a Shore A hardness of at least 30, the process comprising the step of contacting at polyurethane reactive conditions
    (1) A polyol composition comprising in weight percent based upon the weight of the composition:
       A. 10 to 60% of a saturated polyester polyol of ethylene/butane/adipate of a nominal molecular weight and with a functionality of 2 or more;
       B. 40 to 90% of a polyester polyol of ethylene/trimethylol propane/neopentyl adipate of nominal molecular weight and with a functionality of 2.5 or more;
       C. 0 to 20% alkyl diol chain extender glycol;
       D. 0 to 0.4% polymethyl alkyl siloxane defoamer dissolved in an isoparaffin;
       E. 0 to 5% desiccant paste comprising 50 weight percent (wt %) of a zeolite powder suspension in castor oil;
       F. 0 to 0.8% polybutadiene oligomer;
       G. 0 to 10% antistatic agent;
       H. 0 to 0.5% surface modified fumed silica;
       I. 5 to 15% tris (2-chloro-1-methylethyl) phosphate flame retardant;
       J. 5 to 15% ammonium polyphosphate flame retardant; and
       K. 0.002 to 0.1% organometallic catalyst other than mercury- or lead-based organometallic catalyst; with
    (2) A prepolymer composition comprising in weight percent based on the weight of the prepolymer composition:
       L. 10 to 60% of a saturated polyester polyol of ethylene/butane/adipate of a nominal molecular weight and with a functionality of 2 or more;
       M. 30 to 60% diphenylmethane diisocyanate (MDI) containing approximately 97% of 4,4-diphenylmethane diisocyanate isomer and 3% of 2,4-diphenylmethane diisocyanate isomer;
       N. 5 to 15% modified MDI; and
       O. 0 to 0.1% para-nitrobenzoyl chloride.

11. The process of claim 10 comprising an additional step in which the 1,4-butane diol chain extender glycol is added as a third component separate from the polyol composition and the prepolymer composition.

12. The process of claim 11 comprising a further step in which the organometallic catalyst is absent from the polyol composition and added as a fourth component separate from the polyol composition, prepolymer composition and chain extender component.

13. The process of claim 10 in which the polyol composition comprises a quaternary ammonium salt of alkali metal diluted in a trialkyl phosphate or an imidazolium salt as the antistatic agent.

14. The process of claim 10 in which the polyol composition comprises di-n-octyltin bis (isooctyl mercaptoacetate) as the organometallic catalyst and 1-ethyl-3-methyl imidazolium dicyanamide as the antistatic agent.

15. A fire retardant and static dissipative polyurethane elastomer substantially free of mercury and having a Shore A hardness of at least 30 made by the process of claim 10.

\* \* \* \* \*